(12) United States Patent
Sasson et al.

(10) Patent No.: US 12,204,426 B2
(45) Date of Patent: Jan. 21, 2025

(54) SYSTEMS AND METHODS FOR MONITORING PERFORMANCE OF A MACHINE LEARNING MODEL EXTERNALLY TO THE MACHINE LEARNING MODEL

(71) Applicant: Data Science Consulting Group Ltd, Tel Aviv-Jaffa (IL)

(72) Inventors: Elan Sasson, Tel Aviv (IL); Gideon Rosenthal, Ramat Gan (IL)

(73) Assignee: Data Science Consulting Group Ltd, Tel Aviv-Jaffa (IL)

( * ) Notice: Subject to any disclaimer, the term of this patent is extended or adjusted under 35 U.S.C. 154(b) by 1211 days.

(21) Appl. No.: 16/941,595

(22) Filed: Jul. 29, 2020

(65) Prior Publication Data

US 2021/0035021 A1    Feb. 4, 2021

Related U.S. Application Data

(60) Provisional application No. 62/879,546, filed on Jul. 29, 2019.

(51) Int. Cl.
*G06N 20/00* (2019.01)
*G06F 11/30* (2006.01)
(Continued)

(52) U.S. Cl.
CPC ........ *G06F 11/302* (2013.01); *G06F 11/3466* (2013.01); *G06N 3/08* (2013.01); *G06N 20/00* (2019.01)

(58) Field of Classification Search
None
See application file for complete search history.

(56) References Cited

U.S. PATENT DOCUMENTS

2012/0054184 A1    3/2012    Masud et al.
2016/0071027 A1*    3/2016    Brand ..................... H04L 45/08
                                                            706/12

FOREIGN PATENT DOCUMENTS

CN    101827002    9/2010
CN    103150470    12/2015

OTHER PUBLICATIONS

Bifet, Albert. "Classifier concept drift detection and the illusion of progress." Artificial Intelligence and Soft Computing: 16th International Conference, ICAISC 2017, Zakopane, Poland, Jun. 11-15, 2017, Proceedings, Part II 16. Springer International Publishing, 2017. (Year: 2017).*

(Continued)

*Primary Examiner* — Daniel T Pellett

(57) ABSTRACT

There is provided a method of monitoring performance of a machine learning model externally to the machine learning model, comprising: monitoring data elements being fed into a machine learning model trained on a training dataset of historical training data elements, wherein the data elements are each associated with a respective time after the time associated with the training dataset, analyzing the data elements for identifying shift(s) between at least two subsets of the data elements, computing according to the shift(s), measurement(s) denoting an expected effect on output of the model, and detecting a misclassification event by the model when the measurement(s) exceeds a threshold of the model, wherein the monitoring, the analyzing, the computing, and the detecting are performed externally to the model, without accessing at least one of: data stored within the machine learning model, an implementation of the model, and data structures of the model.

28 Claims, 9 Drawing Sheets

(51) Int. Cl.
*G06F 11/34* (2006.01)
*G06N 3/08* (2023.01)

(56) References Cited

OTHER PUBLICATIONS

Zliobaite, Indre. "Learning under concept drift: an overview." arXiv preprint arXiv:1010.4784 41 (2010). (Year: 2010).*

* cited by examiner

SYSTEMS AND METHODS FOR MONITORING PERFORMANCE OF A MACHINE LEARNING MODEL EXTERNALLY TO THE MACHINE LEARNING MODEL

RELATED APPLICATION(S)

This application claims the benefit of priority under 35 USC § 119(e) of U.S. Provisional Patent Application No. 62/879,546 filed on Jul. 29, 2019, the contents of which are all incorporated by reference as if fully set forth herein in their entirety.

FIELD AND BACKGROUND OF THE INVENTION

The present invention, in some embodiments thereof, relates to machine learning models and, more specifically, but not exclusively, to systems and methods for monitoring a machine learning model.

Machine learning models are trained using a training dataset, having a set of input data elements and associated classification categories denoting a ground truth. The machine learning model is trained to classify previously unseen data elements (i.e., not in the training dataset).

SUMMARY OF THE INVENTION

According to a first aspect, a method of monitoring performance of a machine learning model externally to the machine learning model, comprises: monitoring a plurality of data elements being fed into a machine learning model trained on a training dataset of historical training data elements, wherein the plurality of data elements are each associated with a respective time after the time associated with the training dataset, analyzing the plurality of data elements for identifying at least one shift between at least two subsets of the plurality of data elements, computing according to the at least one shift, at least one measurement denoting an expected effect on output of the model, and detecting a misclassification event by the model when the at least one measurement exceeds a threshold of the model, wherein the monitoring, the analyzing, the computing, and the detecting are performed externally to the model, without accessing at least one of: data stored within the machine learning model, an implementation of the model, and data structures of the model.

According to a second aspect, a system for monitoring performance of a machine learning model externally to the machine learning model, comprises: at least one hardware processor executing a code for: monitoring a plurality of data elements being fed into a machine learning model trained on a training dataset of historical training data elements, wherein the plurality of data elements are each associated with a respective time after the time associated with the training dataset, analyzing the plurality of data elements for identifying at least one shift between at least two subsets of the plurality of data elements, computing according to the at least one shift, at least one measurement denoting an expected effect on output of the model, and detecting a misclassification event by the model when the at least one measurement exceeds a threshold of the model, wherein the monitoring, the analyzing, the computing, and the detecting are performed externally to the model, without accessing at least one of: data stored within the machine learning model, an implementation of the model, and data structures of the model.

According to a third aspect, a computer program product for monitoring performance of a machine learning model externally to the machine learning model, comprises: a non-transitory memory storing thereon code for execution by at least one hardware processor, the code including instructions for: monitoring a plurality of data elements being fed into a machine learning model trained on a training dataset of historical training data elements, wherein the plurality of data elements are each associated with a respective time after the time associated with the training dataset, analyzing the plurality of data elements for identifying at least one shift between at least two subsets of the plurality of data elements, computing according to the at least one shift, at least one measurement denoting an expected effect on output of the model, and detecting a misclassification event by the model when the at least one measurement exceeds a threshold of the model, wherein the monitoring, the analyzing, the computing, and the detecting are performed externally to the model, without accessing at least one of: data stored within the machine learning model, an implementation of the model, and data structures of the model.

In a further implementation of the first, second, and third aspects, further comprising monitoring a plurality of classification outputs of the machine learning model in response to the plurality of data elements, wherein analyzing further comprises analyzing the plurality of classification outputs for detecting shifts between at least two subsets of the plurality of classification outputs.

In a further implementation of the first, second, and third aspects, the at least one shift is selected from the group consisting of: a distribution of the plurality of data elements changes between at least two subsets thereof and a conditional distribution of the outputs by the model in response to being fed the plurality of data elements remains unchanged, a distribution of the plurality of data elements remains unchanged between at least two subsets thereof and a conditional distribution of the output by the model in response to being fed the plurality of data elements changes, and the distribution of the plurality of data elements changes between at least two subsets thereof and a conditional distribution of the output by the model in response to being fed the plurality of data elements changes.

In a further implementation of the first, second, and third aspects, the plurality of data elements are part of a dynamic data stream that includes variability over a time interval in values of a sequence of data elements.

In a further implementation of the first, second, and third aspects, further comprising computing a plurality of features from the plurality of data elements, and wherein analyzing comprises analyzing the plurality of features.

In a further implementation of the first, second, and third aspects, further comprising computing an indication of the contribution of each respective feature to the at least one shift and the at least one measurement exceeding the threshold.

In a further implementation of the first, second, and third aspects, the at least one measurement comprises an indication in change of prediction and/or performance metrics of classification and/or clustering outputs of the model.

In a further implementation of the first, second, and third aspects, the at least one shift comprises a generative shift of changes in probability distribution between the at least two subsets of the plurality of data elements, wherein the at least two subsets of the plurality of data elements are obtained from the same data source and assumed to have the same distribution function.

In a further implementation of the first, second, and third aspects, the generative shift is detected when a computed difference of a distinguish function applied to each of the two sets of the plurality of data elements is over a threshold.

In a further implementation of the first, second, and third aspects, the at least one shift comprises data structural changes of the data elements.

In a further implementation of the first, second, and third aspects, the data structural changes are selected from the group consisting of: feature format changes, missing values, new feature, removal of existing features, and erroneous values.

In a further implementation of the first, second, and third aspects, the data structural changes are detected by creating a metadata file descriptor denoting raw features extracted from each of the pluralities of data elements, and comparing the respective metadata file descriptors corresponding to two or more of the subsets of the plurality of data elements to detect data structural changes of at least one raw feature.

In a further implementation of the first, second, and third aspects, further comprising in response to the detected misclassification, generating instructions for re-training of the model using an updated training dataset of updated data elements having associated times after the times associated with the training dataset.

In a further implementation of the first, second, and third aspects, the monitoring is performed by a computing device that is located externally to a server hosting the machine learning model.

In a further implementation of the first, second, and third aspects, monitoring comprises intercepting the plurality of data elements before feeding into the machine learning model.

In a further implementation of the first, second, and third aspects, the model is trained using an unsupervised approach, and the analysis comprises analyzing the plurality of elements for identifying at least one shift in data characteristics of clusters created for each of the at least two subsets of the plurality of data elements.

In a further implementation of the first, second, and third aspects, further comprising generating instructions to halt the model when the at least one measurement exceeds the threshold of the model.

In a further implementation of the first, second, and third aspects, the threshold of the model is at least one of: learned by an external supplement model analyzing the plurality of data elements over a time interval, and/or computing during a calibration process when implementing the model.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
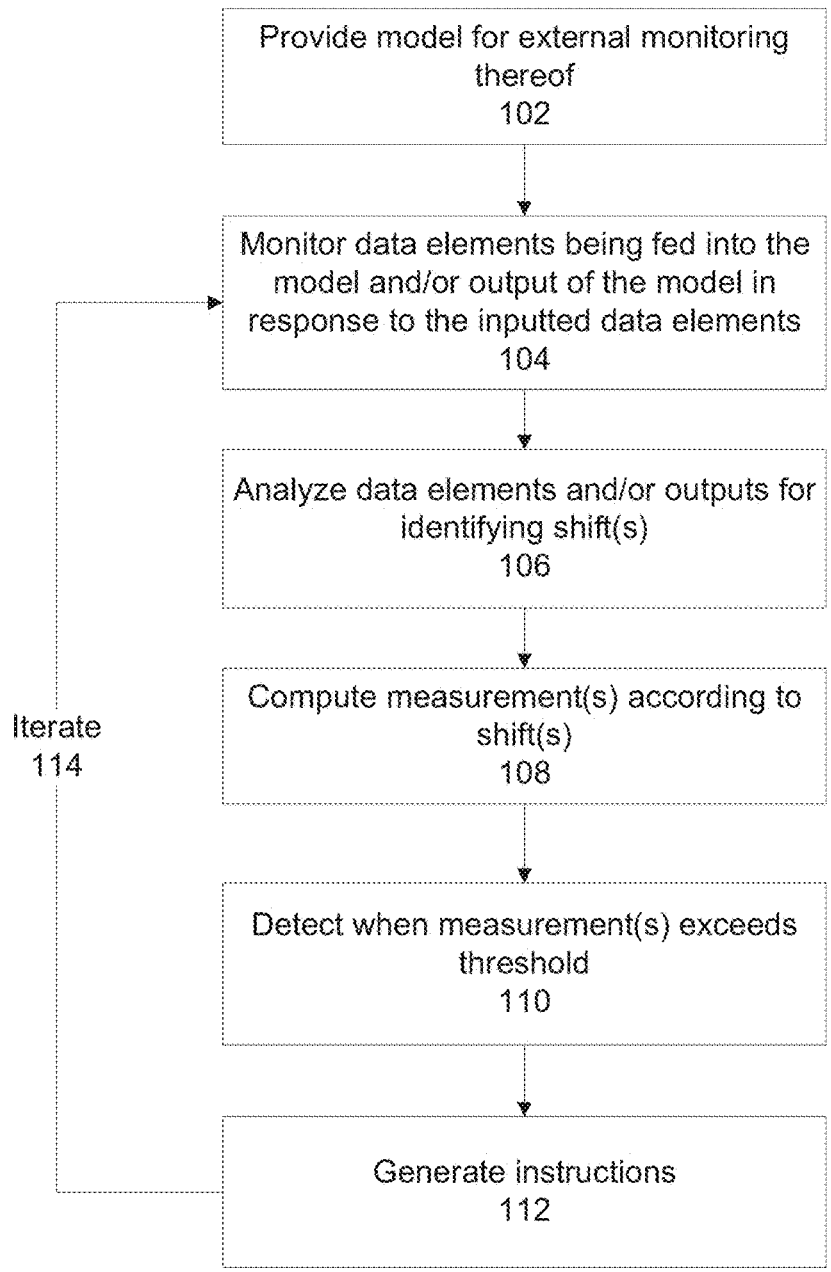
FIG. 1 is a flowchart of a method of monitoring performance of a machine learning model externally to the model, in accordance with some embodiments of the present invention.

An aspect of some embodiments of the present invention relates to systems, methods, an apparatus, and/or code instructions for monitoring of performance of a machine learning model externally to the model, without accessing, for example, one or more of: data stored within the machine learning model (e.g. weights of neurons of a neural network), an implementation of the model and data structures of the model. Data elements being fed into the machine learning model are monitored. Alternatively, or additionally, outputs of the model in response to the fed data (e.g., classification categories, probability values indicative of confidence of the outputted categories) are monitored. The machine learning model is trained on a training dataset of historical training data elements. The monitored data elements may be associated with times that are later than the times of the historical training data elements, for example, the historical training data elements are time stamped images of a traffic intersection obtained over a certain range of days, and the monitored data elements are real time images of the traffic intersection captured after the certain range of dates of the training data. The data elements and/or outputs of the model are analyzed for identifying one or more shifts between two subsets of the data elements and/or outputs, for example, data elements within one-time window are compared with data elements within a sequential time window for detection of the shift. One or more measurements denoting an expected effect on output of the model are computed according to the shift. A misclassification event (e.g., classification output of a supervised learning implementation, and/or clustering output of an unsupervised learning implementation) by the model is detected when the measurement(s) exceeds a threshold of the model (e.g., threshold of the model metrics).

It is noted that not every change in the distribution of the input data affects the model performance. At least some implementations of the systems, methods, apparatus, and/or code instructions described herein may be based on the assumption that some changes do not make skewed prediction. However, it is noted that most change do affect model performance. As described herein, the measurement(s) computed according to the shift(s) denote an expected effect on output of the model, and the misclassification event may be detected when the measurement(s) exceeds a threshold.

The term model refers to a machine learning model, for example, one or more of: deep learning, convolutional neural networks (CNN), recurrent neural network (RNN), long short-term memory (LSTM) neural network, Random Forest, XGBoost, K-NN (nearest neighbor), reinforcement learning and support vector machine (SVM).

As used herein, the term misclassification or misclassification event may refer to supervised models and/or unsupervised models and/or other outputs types of other machine learning models, for example, classification outputs by a model implemented using a supervised learning approach, and/or clustering output by a model implemented using an unsupervised learning approach.

The model may be based on one or more categories of machine learning paradigms, for example, unsupervised learning, supervised learning (e.g., clustering), reinforcement learning, and deep learning algorithms and architectures, and combinations of the aforementioned.

Models may be used for diverse tasks such as classification, regression (categorical and/or continuous target variables), clustering, segmentation, sequencing, association, predictive and descriptive analysis.

The models may fall into one or more of discovery-based analysis methods, for example, data mining, text mining, graph mining, image analysis, video analysis, audio analysis, and combinations of the aforementioned.

As used herein, the term external monitoring refers to monitoring performance of the machine learning model without requiring access to the internals of (e.g., data stored within) the model, and/or without requiring access to the internal structures and/or internal working of the model, for example, without requiring access to the weights of the neurons of the trained neural network.

At least some implementations of the systems, methods, apparatus, and/or code instructions described herein improve the technology of machine learning models, by externally monitoring of the machine learning model, without requiring access to the data stored within the model, and/or without requiring access to the internal structures and/or internal working of the model, for example, without requiring access to the weights of the neurons of the trained neural network.

At least some implementations of the systems, methods, apparatus, and/or code instructions described herein address the technical problem of monitoring performance of machine learning models, in particular, monitoring changes to a model without having access to the model itself. The technical solution described herein provides external monitoring of the machine learning model, without requiring access to the data stored within the model, and/or without requiring access to the internal structures and/or internal working of the model, for example, without requiring access to the weights of the neurons of the trained neural network.

Data elements outputted by respective data sources are dynamic, in constant flux. Models (e.g., Applied-AI, machine learning, and/or data science applications) are created from static models using training datasets of historical data. Such historical datasets do not fully reflect real-world data, which is often unstable and/or subject to change over time. Models built on old data are inconsistent with new fresh data. As the data elements changes, the models trained on historical data may become increasingly unreliable and thus incremental learning is needed incorporating performance monitoring algorithms and distribution comparing algorithms. At least some implementations of the systems, methods, apparatus, and/or code instructions described herein enables to continue using the trained models and sustaining a good performance, by detecting and/or addressing changes in the data elements being fed into the model. A diagnostic paradigm of AI and data science applications has not yet established itself as a de-facto standard. As a result, delivering reliable AI-enabled applications is a major challenge to the AI and machine learning community. A growing body of evidence suggests that the quality of data in the AI space is of utmost importance. Current research is focused on examining AI and data science use-cases with limited to no understanding of the continuous monitoring and curation needed to sustain value from an intelligent system in production reliably.

The plethora of machine learning and applied-AI applications in diverse verticals has led to the creation of new products and/or services which are data-driven and data-based. The current trend focuses on moving these applications from an experimental and exploratory silo environment into a real-life production environment. This transition holds the promise of having actionable AI applications in a variety of use cases. Data, being a fundamental component of machine learning models is subject to a constant drift as the reality constantly changes and thus affecting the quality and distribution of the data. As a result, the performance of AI and machine learning models which are heavily dependent on the data quality and statistical stability, might significantly deteriorate from these data changes.

Traditional machine learning models are unable to detect shifts in datasets automatically as performed by at least some implementations of the systems, methods, apparatus, and/or code instructions described herein, and therefore such traditional machine learning models may be retrained periodically on a new and untested dataset which are suboptimal for the model. Thus, models decay over time as the changes in the data are not adequately detected (The changes may occur, for example, because of the time nature of the data, or in certain frameworks, applying the AI model may change the new data). In other cases, machine learning may be developed to internally include detectors, however such detectors fail in detecting relevant changes in the data. Integrated detectors lack interpretability and may not be generically applicable to new applications and models, given the tight integration with specific application and development platform. The lack of modularity, interpretability and extensibility of detectors resulting in undetected critical changes in temporal datasets is addressed by at least some implementations of the systems, methods, apparatus, and/or code instructions described herein.

The paradigm of machine learning solutions for dynamical, non-linear and/or in-stream analytic imposes a real-life non-stationary data problem. ML business solutions cannot be "one and done", but rather applied on a repeated basis. Dynamic ML is machine learning requiring on-going monitoring of data variations over time; it requires "real-time recursive" learning processes and time-varying data monitoring. Learning may happen from "past experience" but the arrival sequence of new inputs is important, and faults will, likely, increase in amplitude and frequency of occurrence as time passes before ending in a failure such as misclassification event detected as measurements exceeding thresholds in the model performance due to shifts in new data sets, as described herein.

Policymakers, legislators and regulators are signaling that they are going to step in to ensure reliable AI solutions in many "highly sensitive" systems provided to the public and require assessments of those systems. For example, both the European committee and the American Senate recently introduced legislation that would require companies to audit AI systems for data quality that may be producing skewed results given the coalescing of data and AI. The European committee has recently published—the Ethics Guidelines for Trustworthy AI (accessible at https://ec(dot)europa(dot)eu/digital-single-market/en/news/ethics-guidelines-trustworthy-ai) which includes a chapter referring to 'Quality and integrity of data' stating that "The quality of the data sets used is paramount to the performance of AI systems".

At least some implementations of the systems, methods, apparatus, and/or code instructions described herein detect changes in datasets of data elements in a dynamic environment where for example, a machine learning model is trained on one version of the dataset (i.e., historical data elements), however a future version of the data elements obtained after the historical training dataset, which is not static and non-stationary by its nature may affect the performance of the machine learning model.

The solution described herein provides for agnostic monitoring and/or analyzing of the reliability and/or constancy of the machine learning model being fed time-varying data sources, as events detected over time, of measurements exceeding thresholds of the model performance due to shifts in the data, without peering into the model's internals.

At least some implementations of the systems, methods, apparatus, and/or code instructions described herein provide an artificial intelligence based solution for a comprehensive, full scale and/or exhaustive testing, detection and analysis of dataset shifts in machine learning and/or AI-applied applications.

At least some implementations of the systems, methods, apparatus, and/or code instructions described are agnostic to the machine learning models and/or development platform.

At least some implementations of the systems, methods, apparatus, and/or code instructions described herein may represent and/or perform a blackbox testing process for testing the functionality of model(s), without necessarily knowing the details of the implementation of model(s) and/or without knowing the internal details of the processes used to create the model, including for example, internal processes and/or data structures and/or stored values.

At least some implementations of the systems perform a blackbox testing process for testing the functionality of model(s), without necessarily having the data, which has been used to train the model or in production.

At least some implementations of the systems, methods, apparatus, and/or code instructions described herein improve the technology of machine learning models by performing quality control checks on models from a data quality assurance perspective.

At least some implementations of the systems, methods, apparatus, and/or code instructions described herein improve the technology of machine learning models, by providing real time control and/or adaptation of the model, and/or generating instructions for real time adaptation of the model inputs and/or outputs. For example, automatic control of machine learning models execution (e.g., using an API call) which may be used to halt the model when the shift in the dataset of data elements may dramatically affect the performance of the model.

At least some implementations of the systems, methods, apparatus, and/or code instructions described herein provide a reliable AI solution in an ever-changing environment given the unification and the tight coupling between machine learning models and data.

Is it noted that existing methods do not integrate multiple test points described herein for detecting shifts, such as structural shifts and/or generative shifts. Standard methods use a narrow scope of tests, while in contrast the tests for shifts described herein are global in nature. Some existing methods limit the scope of the targeted models, and other methods provide a solution based on a specific testing metric (e.g., KL-divergence) and/or for a specific machine learning algorithm (e.g. prediction). In contrast, at least some implementations of the systems, methods, apparatus, and/or code instructions described herein provide a global testing approach, which is not application, nor machine learning model or development platform dependent.

At least some implementations of the systems, methods, apparatus, and/or code instructions described herein are agnostic to the actual implementation of the different tasks and/or phases used for building machine learning models and/or data science applications as described, for example, by the CRISP-DM (Cross-industry standard process for data mining) which is considered the leading methodology used by industry. The actual implementation of the four major phases of the CRISP-DM, namely—data understanding, data preprocessing, modeling and evaluation are decoupled from the functionality of the systems, methods, apparatus, and/or code instructions described herein. The approach taken by at least some implementations of the systems, methods, apparatus, and/or code instructions described herein is based on a process of behavioral monitoring and/or testing in which the internal structure/design/implementation of the data element being tested is not known to the tester. In the domain of software testing this approach in known as black-box testing where the examination is applied without peering into the internal structures or workings of the module under testing. In the black-box testing approach, the system monitors and tests the input which flows into the black box and the output that it produces without reference to the internal structure of the module. For example, without knowledge of the actual implementation of the preprocessing phase as defined in the CRISP-DM, providing inputs (observations) and outputs (modeling) against expected input and output measures, at least some implementations of the systems, methods, apparatus, and/or code instructions described herein determine shifts in the dataset in this phase. Equivalently, the same procedure may be applied to the modeling phase where the input is now the modeling table created in the previous phase namely—preprocessing, and the outputs are prediction and metrics associated with the actual model without knowing exactly what model was used. Based on that, the system determines the shift in model performance. This approach guarantees a high level of autonomy and extensibility, across diverse types of existing and future implementation of AI-applied solutions.

At least some embodiments of the present invention improve the technology of automatically updating a trained model using new data, by externally monitoring the performance of the model to detect when the output of the model becomes in adequate, for example, classification performance of the model falls below a threshold. In contrast, a typical machine learning life cycle may include a continuous loop of data input. There is a constant need to collect new data and update a machine learning model based on what is happening in the world, i.e., data elements stored in one or more data sources. Continuously feeding the model with recent high quality and relevant data is a real technical challenge that needs to be monitored as new data flows into the technology pipeline of machine learning models. This process may involve many different software systems and/or libraries, provided that the data preparation and/or training may use multiple open-sources data resources. There is a real challenge of passing machine learning models between these different steps along the process of building the final model. Finally following the deployment phase, it is imperative to monitor and/or to governance the model, ensuring that the model performs well with new data influxes. Companies and/or organizations and/or other entities applying AI-driven applications and/or models go through the described steps to come up with a solution separately for each developed application, which makes it very difficult to maintain and/or to standardize. As a result, companies and/or large tech companies build custom machine learning platforms. However, the lack of diagnostic machine learning together with standards and/or protocols creates a disordered environment where each platform supports only parts of the machine leaning life cycle. Although, these platforms are very powerful they will provide their own standards if the machine learning (ML) application was developed and deployed within the APIs inside these platforms. Moreover, theses platforms are often limited to a few processes and suffer from a limited scope of functionality and frameworks, which go against the widespread notion in developing ML application where before deployment, practitioners and data scientists need to experiment with the latest and best-of-breed processes and frameworks across a variety of platforms. Blocking this opportunity creates a tension that potentially may prevent using reliably a set of models across different ML platforms, given that each platform is highly customized and tied to a specific infrastructure as there is no sharing of common work across them. At least some implementations of the systems, methods, apparatus, and/or code instructions described herein provide an open and/or diagnostic solution that affords all the benefits of working and/or integrating with different ML platforms in a reliable way. The open design described herein enables monitoring shifts in datasets, in a way which is not restricted to current and/or most importantly to future ML development platforms, programming languages, process libraries and/or internal tools.

To achieve the above objects, the technical solution adopted by the invention is to provide an AI-enabled system to detect and visualize dataset shifts in AI-based applications to ensure the reliability and validity of these applications in diverse domains with such requirements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages such as Python. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
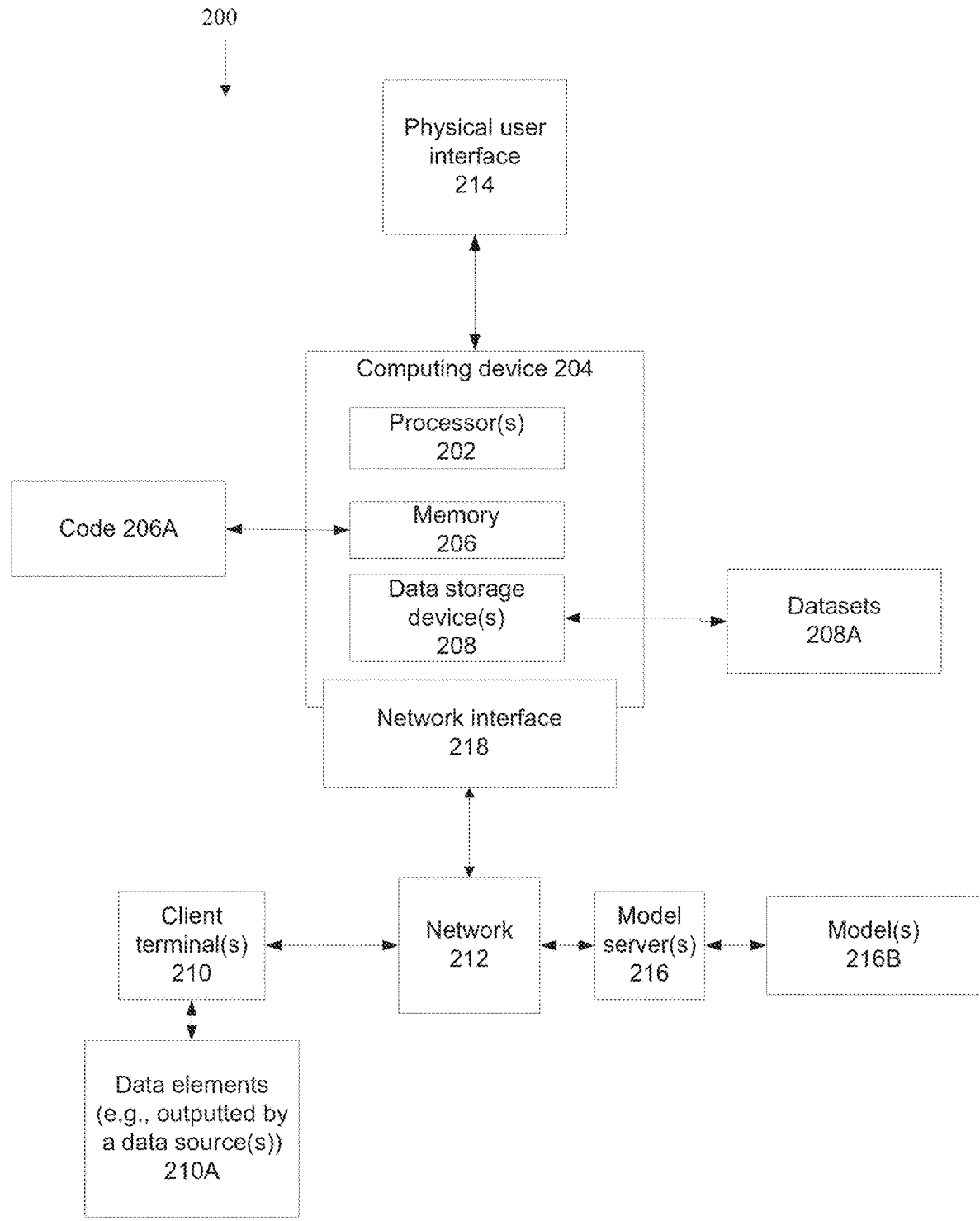
FIG. 2 is a block components diagram of a system for monitoring performance of a machine learning model by a computing device external to a model, in accordance with some embodiments of the present invention.

Reference is now made to FIG. 1, which is a flowchart of a method of monitoring performance of a machine learning model externally to the model, in accordance with some embodiments of the present invention. Reference is also made to FIG. 2, which is a block diagram of the components of a system 200 for monitoring performance of a machine learning model 216B by a computing device 204 external to model 216B, in accordance with some embodiments of the present invention. System 200 may implement the acts of the method described with reference to FIG. 1, by processor(s) 202 of computing devices 204 executing code instructions (e.g., code 206A) stored in a memory 206 (also referred to as a program store).

Computing device 204 externally monitors performance of machine learning model 216B optionally hosted by a model server 216, as described herein. Computing device 204 may monitoring multiple models 216B hosted on respective severs 216. Model 216B is fed data elements 210A from a data source, optionally hosted by a client terminal 210. Multiple streams of data elements 210A from multiple different sources hosted by respective multiple client terminals 210 may be fed into one or more models 216B.

Computing device 204 and/or server(s) 216 and/or client terminals(s) 210 may be implemented as, for example one or more and/or combination of: a group of connected devices, a client terminal, a server, a search engine server, a virtual server, a computing cloud, a virtual machine, a desktop computer, a thin client, a network node, a network server, and/or a mobile device (e.g., a Smartphone, a Tablet computer, a laptop computer, a wearable computer, glasses computer, and a watch computer).

In an exemplary implementation, computing device 204 is implemented as an n-tier scalable and/or redundant architecture of networked services and applications, optionally including client terminal(s) 210 and/or model sever(s) 216, using request mechanisms and/or application programming interfaces (API)s such as REST and/or Web Services over HTTP and/or other application and network layers. The architecture allows to post data (create and/or update), read data (e.g., queries), and delete data for all four CRUD (Create/Read/Update/Delete) operations. Computing device 204 and/or other related components may be implemented as a cloud-based service or as on-premise installation.

Optionally, computing device 204 may be implemented as one or more servers (e.g., network server, web server, a computing cloud, a virtual server, a network node) that provides services to multiple servers 216 over a network 212, for external monitoring of model(s) 216B hosted by respective server(s) 216, as described herein. Exemplary service models include: software as a service (SaaS), on-premise installation, and/or a novel managed service DOC (data operation center). The DOC may be a centralized computing device and/or service that monitors dataset shifts issues on an organizational and/or technical level. The DOC may be operated in a central location from where the staff of data science analysts supervises and/or monitors in real-time the reliability of AI-enabled models, for example, in production environments. The DOC operation over time may derive aspects of the quality data to a specific domain by learning from customers active in the same space and/or domain operating under the DOC managed services so that the computing device may apply transfer learning mechanism across different datasets.

Communication between client terminal(s) 210 and/or model server(s) 216 and/or computing device 204 over network 212 may be implemented, for example, via an application programming interface (API), software development kit (SDK), functions and/or libraries and/or add-ons added to existing applications executing on client terminal(s) 210, an application for download and execution on client terminal 210 and/or model server 216 that communicates with computing device 204, function and/or interface calls to code executed by computing device 204, a remote access section executing on a web site hosted by computing device 204 accessed via a web browser executing on client terminal(s) 210 and/or server 216.

Hardware processor(s) 202 of computing device 204 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include a single processor, or multiple processors (homogeneous or heterogeneous) arranged for parallel processing, as clusters and/or as one or more multi core processing devices.

Memory 206 stores code instructions executable by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code 206A that implements one or more features and/or acts of the method described with reference to FIG. 1 when executed by hardware processor(s) 202.

Computing device 204 may include data storage device(s) 208 for storing data, for example, datasets 208A which store different sets of data elements that are analyzed to detect shifts thereof, as described herein. Data storage device(s) 208 may be implemented as, for example, a memory, a local hard-drive, virtual storage, a removable storage unit, an optical disk, a storage device, and/or as a remote server and/or computing cloud (e.g., accessed using a network connection).

Network 212 may be implemented as, for example, the internet, a broadcast network, a local area network, a virtual network, a wireless network, a cellular network, a local bus, a point to point link (e.g., wired), and/or combinations of the aforementioned. In some implementations, network 212 may be implemented as an internal communication interface, for example, model 216B may be executed by a virtual machine implementation of model server 216 hosted by a hypervisor running on computing device 204.

Computing device 204 may include a network interface 218 for connecting to network 212, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 204 and/or client terminal(s) 210 and/or server(s) 216 include and/or are in communication with one or more physical user interfaces 214 that include a mechanism for user interaction, for example, to enter data (e.g., define parameters for the external monitoring of the model) and/or to view data (e.g., review raised alarms indicating detected shifts in the data elements).

Exemplary physical user interfaces 214 include, for example, one or more of, a touchscreen, a display, gesture activation devices, a keyboard, a mouse, and voice activated software using speakers and microphone.

At 102, one or more models are provided for external monitoring of performance thereof. The models, which may be hosted by a model server, are externally monitored, for example, by the computing device, as described herein.

The model may be trained on a training dataset of historical training data elements, optionally time stamped data elements. The training data elements may have associated timestamps that are earlier in time in comparison to the data elements which are fed into the trained model. The data elements with later time stamps are monitored as described herein. It is noted that supervised learning models may include target variable for prediction.

At 104, data elements being fed into the machine learning model are monitored. Alternatively or additionally, outputs of the model generated in response to the data elements fed into the model are monitored. The monitored data elements and/or the outputs may be associated with times (e.g., time stamps) that are later than the time stamps of the data elements of the training dataset used to train the model.

The data elements may be, for example, data records, observations, images, audio files, output of sensor(s), text, and combinations of the aforementioned.

The data elements may be in different formats, for example, structured data (e.g., tabular data), semi-structured data (e.g., XML, JSON), unstructured data (e.g., text, image, audio, video), and combinations of the aforementioned.

Datasets may be provided, for example, as temporal data chunks, incremental data, one-time uploaded data, time-series, batch mode, and online mode.

The data elements may be organized in temporal order (e.g., from a stream of real-time data sources) and/or a data aggregation external module. Streaming and/or batch data sources may be mixed. The data elements may be classified according to data sources and/or the different formats of the datasets (CSV, SQL relation, JSON, XML, RTF, BLOB).

The data elements may be divided into structured, semi-structured and/or unstructured data formats. The objects in the dataset of data elements may be divided to obtain data blocks containing a predefined number of records and/or predefined number of dimensions (i.e., features, variables). The data elements may be classified to different categories such as textual, tabular, time series, image, video, audio, graph and/or spatial data.

Optionally, the data elements are part of a dynamic data stream and/or sequence that is variable over a time interval. Values of the sequence of the data elements may vary over the time interval. For example, the data elements are outputted by a sensor, at regular intervals. The sensor outputs vary over time according to the measurements performed by the sensor. However, the number of packets traversing over a link of the network during a one second time window vary according to network traffic. In another example, images of traffic at a traffic intersection vary according to time of day, where at rush hour the traffic intersection is busy, and in the middle of the night there may be no traffic at all.

Optionally, the data elements are monitored before being fed into the machine learning model, for example, by being intercepted by a network sniffer device that intercepts the data elements travelling over the network to the model.

Optionally, the data elements fed into each respective model are obtained from the same data source and/or assumed to have the same distribution function.

At 106, the data elements of the model are analyzed for identifying one or more shifts between two or more subsets of the data elements. Alternatively or additionally, outputs of the model (in response to an input of the data elements) are analyzed for identifying one or more shifts between two or more subsets of the outputs.

As described herein, the two or more subsets of the data elements may sometimes alternatively or additionally refer to two or more subset of the outputs of the model in response to an input of the data elements.

The data elements are arranged into two or more subsets, for example, by using time windows that do not overlap. Data elements captured in an earlier time window are compared to the data elements captured in the later time window.

Data elements of the two or more subsets may originate from the same data source, for example, outputted by the same sensor at different time intervals.

Dataset shift may be a situation in which two or more temporal dataset chunks are in some way different.

The shift types may be abrupt, gradual, incremental and/or re occurring. The overall set of changes which stems from a different data generator mechanism may affect the overall performance of a model in many types of applications, domains and verticals.

Optionally, features are computed from the data elements and/or the outputs. The features are analyzed for identifying the shift(s). Features may be, for example, an encoding outputted by a neural network, hand crafted features, combinations of values from the data elements, functions applied to the data elements, and/or other implementations.

Optionally, when the model is trained using an unsupervised approach, the data elements are analyzed for detecting the shift(s) according to data characteristics of clusters created for each of the two or more subsets of the data elements. The measurement(s) may be for assessing cluster results, such as cluster validation and/or assessment, for example, clustering evaluation for assessing the goodness and/or quality of the clustering, and clustering tendency for assessing the suitability of applying clustering to a data set, e.g., whether the data set has an inherent group structure. Exemplary measures include: purity, maximum matching, F-measure, entropy-based measures, pairwise measures, Jaccard coefficient, Silhouette coefficient, Hopkins statistics. The measures may be validated as sequential data sets may exhibit changes in the inherent data characteristics.

Optionally, the detected shift is a generative shift indicative of changes in a probability distribution and/or other statistical measures (e.g., mean, median, variance, other customized measures for example, as described herein) between the two or more subsets of data elements. The two subsets of the data elements may be collected from the same data source and/or assumed to have the same distribution function. The generative changes may be changes in the inherent characteristics of the data elements. In probabilistic terms, such changes may occur by non-homogeneity of the data elements.

The generative shift may be detected, for example, by checking various statistical measures, covariate shift, conditional distributions shift, label and/or concept shifts, using processes based on the data formats and data types.

Statistical changes in the distribution of the data flow elements leading to the detection of the generative shift might stem, for example, from the marginal distributions and/or conditional distribution, covariate shift, concept shift and/or label shift(s). Statistical changes between the subsets may be computed, for example, by computing measures of central tendency, skewed distributions, and/or correlations.

Exemplary shifts include one or more of:
Covariance shift: A change in the distribution of the data elements (i.e., being fed into the model) between two or more subsets, and an unchanged conditional distribution of the output by the model in response to being fed the data elements. The change or lack of change may be determined according to a requirement, for example, range and/or threshold of values that define the boundary between change and lack of change.
Label shift and/or target shift: No change in a distribution of the data elements between two or more subsets, and a change in the conditional distribution of the output by the model in response to being fed the data elements.
Inclusive shift: Change in the distribution of the data elements between the two or more subsets, and change in a conditional distribution of the output by the model in response to being fed the data elements.

The generative shift may be detected when a computed difference of a distinguish function applied to each of the two sets of the data elements is over a threshold. In terms of mathematical representation: Let $x_t$ and $x_{t+1}$ denote two temporal data sets of data elements provided by the same origin data source and assumed to have the same distribution function denoted $f_{X,\theta}(x)$ in sequential times defined in a time space denoted by T. A distinguish function denoted by $\varphi(\bullet)$, may be composited from a few functions, and may consider the variance, covariance and/or interactions between the variables. Declaration of changes will attain when the following is met:

$$|\varphi(X_t)-\varphi(X_{t+1})| \geq g_\theta(M_t, X_t, X_{t+1}),\ 0 \leq t \leq T.$$

For a predefined constant denoted $M_t$ considered as the threshold parameter. The threshold $M_t$ may be computed, for example, in a calibration process, when implementing the model, and/or is learnt over time by a supplement process (e.g., another model).

For example, for the distribution of the raw feature gender, the expected value which is known beforehand in step t (e.g., 50% M and 50% F) is compared against the distribution at step t+1 (e.g., 20% M and 80% F).

Alternatively or additionally, the detected shift is based on identified data structural changes of the data elements. Exemplary data structural changes include: feature format changes, missing values, new feature, removal of existing feature, introduction of new features, and erroneous values. Structural changes may result, for example, from technical problems (e.g., operation problem of a sensor), and/or introduction and/or removal of features. Exemplary data structural changes may be for derived features that are constructed (e.g., internally in the preprocessing phase) as an artifact of feature engineering, for example, by combining two or more raw features extracted from the data elements (e.g., gender=M, age=55) to create a new derived feature (e.g., adult man) which originally did not appear in the raw data source. The introduction of the derived features may be detected at a certain time interval denoted T without peering into the feature engineering internals procedures.

The data structural changes may be detected by creating a metadata file descriptor denoting raw features extracted from each of the data elements, for example, as described herein. The respective metadata file descriptors corresponding to two or more of the subsets of data elements are compared to detect data structural changes of one or more raw features.

Alternatively or additionally, the shifts are in the inherent data characteristics and/or the skeletal aspects of the data elements, for example, a change in the data structure of the data elements.

Alternatively or additionally, the shifts are computed based on a customized set of rules, for example, designed for the specific model being evaluated.

Figure 3A:
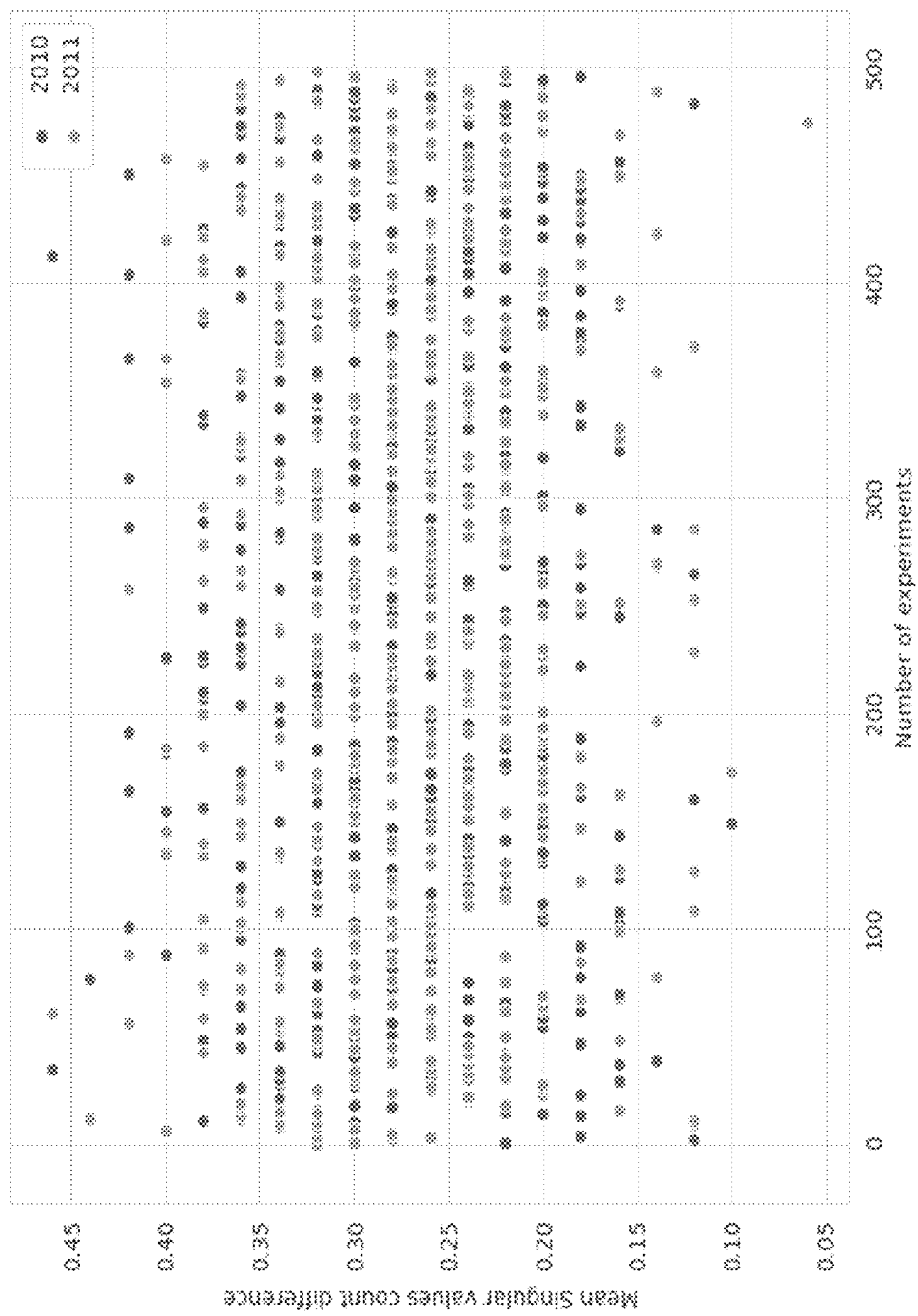
FIGS. 3A-C are graphs depicting the process of detecting shifts, in accordance with some embodiments of the present invention.
Figure 3B:
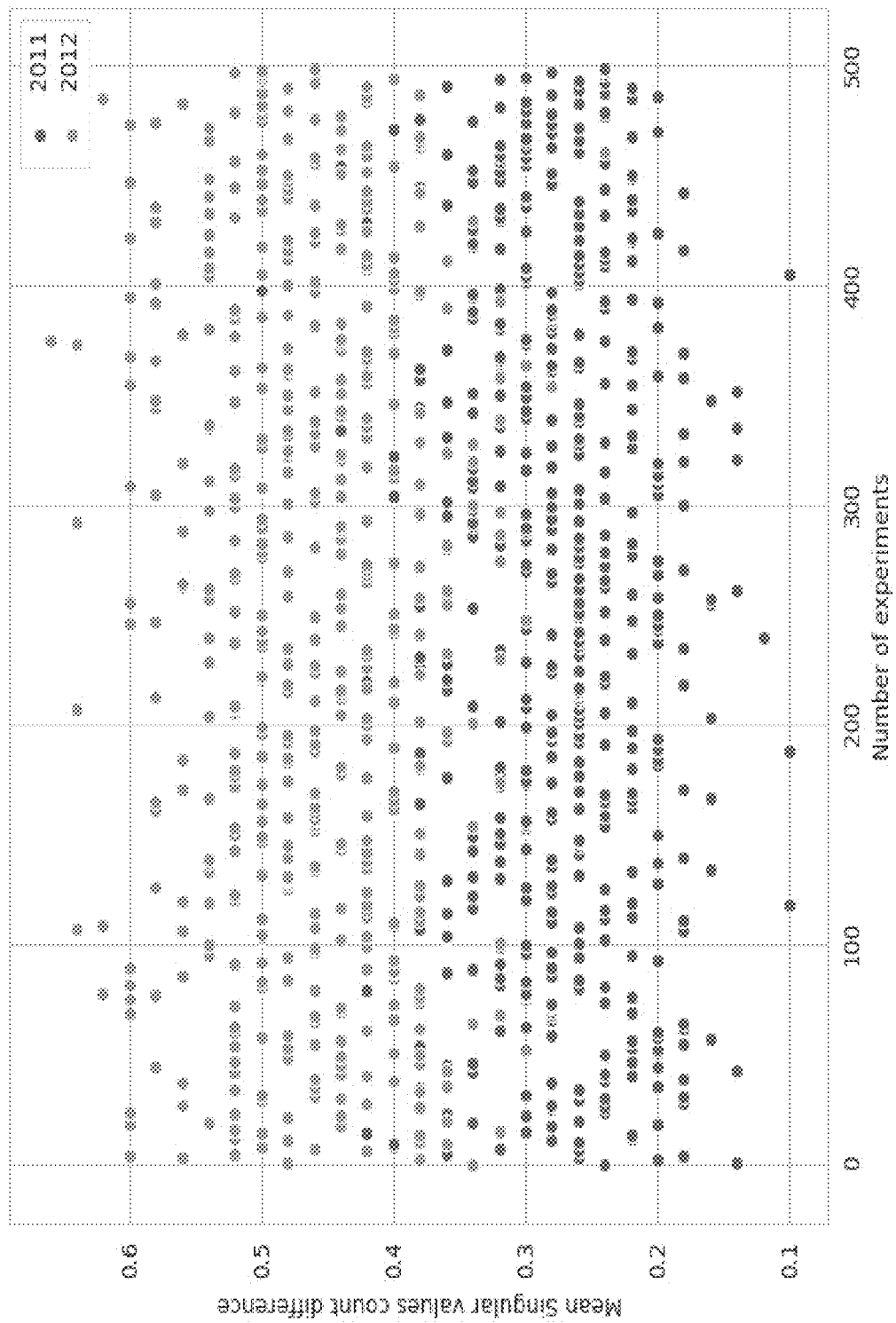
Figure 3C:
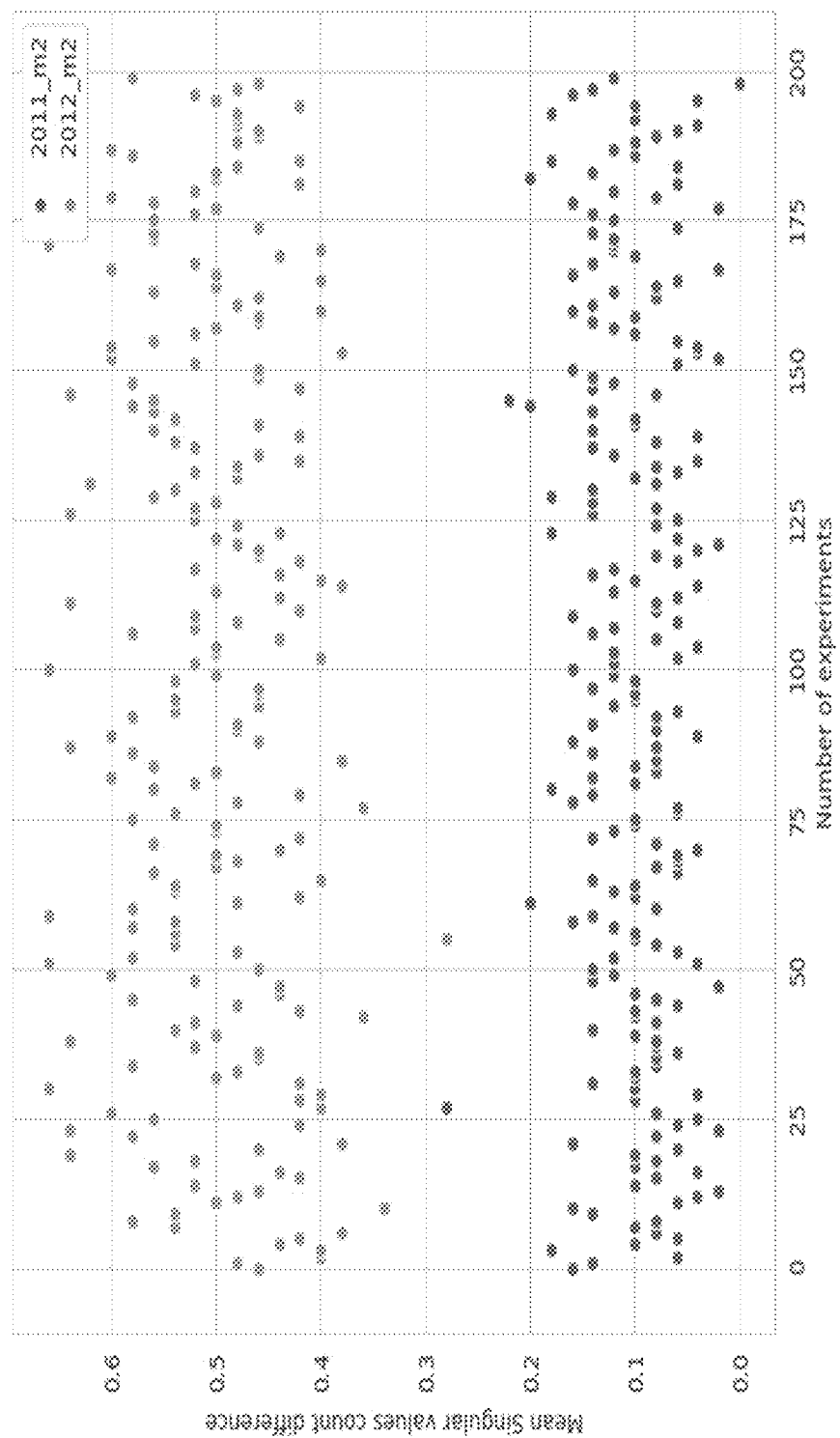

Reference is now made to FIGS. 3A-C, which are graphs depicting the process of detecting shifts, in accordance with some embodiments of the present invention. FIG. 3A is a sample dataset of a time series for 2010-2011, where no shift is detected between a subset of data elements having timestamps of the year 2010 in comparison to a sequentially later subset of data elements having timestamps in the year 2011. FIG. 3B is a sample dataset of a time series for 2011-2012, where a shift is detected as described herein between a subset of data elements having timestamps of the year 2011 in comparison to a sequentially later subset of data elements having timestamps in the year 2012. FIG. 3C is a sample dataset of a time series for 2011-2012, where a significant shift in a subset of data elements having timestamps of the year 2012 is accrued in the second half of 2011.

Referring now back to FIG. 1, at 108, one or more measurements are computed according to the computed shift(s). The measurements denote an expected effect on output of the model.

Optionally, the measurements denote the expected effect on the output of the model in response to the detected shift, for example, metrics, measures, predictions, and/or outputs of the model, for example, classification results, probability of accuracy of classification, area under curve (AUC), an indication in change of prediction and/or performance metric of classification outputs of the model, prediction accuracy, precision, recall. The measurement may be computed based on the type of model (e.g., supervised or unsupervised), or the measurement may be computed independent of the type of model. For example, a shift that detects a certain new feature in the data elements may be associated with a measurement indicative of a predicted decrease in accuracy of classification by the model of 20%.

The measurement may be computed, for example, by a set of rules, a mapping table, a set of functions, and/or another trained machine learning model that is executed by the computing device externally to the model being monitored. Such machine learning model may be trained using a training dataset of detected shifts and a ground truth of outputs and/or performance metrics of different models fed the data elements for which the shift is detected.

At 110, an indication of the measurement(s) exceeding a threshold of the model (e.g., threshold of the model metrics) is detected. The threshold parameters may be based, for example, on a requirement specification of the model's reliability and/or stability. The measurement exceeding the threshold may denote an abnormality of operation of the model, optionally a misclassification event by the model and/or may denote a decay in target classification performance by the model and/or a lack of reliability and/or stability of the model. For example, then the measurement is a computed predicted decrease in accuracy of classification of the model by 20%, which exceeds a threshold decrease in accuracy of 10%, indicating that the results being outputted by the model are inaccurate.

When the measurement(s) falls below the threshold, the model is determined to be working as expected.

The threshold of the model may be computed, for example, learned by an external supplement model analyzing the data elements over a time interval, and/or computed during a calibration process when implementing the model. The threshold may be a predefined value that is manually set and/or obtained as a default value. For example, the entity using the monitored model may determine that the classification performance must be highly accurate and cannot fall below 90%, or alternatively may determine that performance may be flexible and should be at least 50%.

It is noted that the threshold is an exemplary implementation. The threshold may be replaced by a range, where measurements outside the range denote abnormalities in the model and measurements within the range denote expected operation of the model. In another implementation, measurement(s) falling below the threshold and/or within the range denote abnormal operation of the model.

The threshold value may change over time. For example, in response to an update of the model using updated training data triggered by detection of the measurement increasing the threshold (denoting decay in performance of the model). The threshold value may be re-computed for the updated model.

At 112, instructions may be generated in response to the detected measurement exceeding the threshold of the model (e.g., in response to the detected indication of misclassification event).

Optionally, the generated instructions are for creating an alert and/or notifications of the detected measurement exceeding a threshold, which may be indicative of the misclassification event. The alert and/or notifications may be provided, for example, presented on a display, sent as an email, stored in a memory, provided to a remote server and/or client terminal, and/or provided to another process for further processing. Notifications may be provided for a quick understanding of the data elements and/or outputs (i.e., datasets) in multiple dimensions, for example, the distribution of values across features, unexpected features values, missing values, measures of central tendency, skewed distributions, missing features, and the like.

Optionally, the generated instructions may be to halt the output by the model. The model may be halted to prevent erroneous classification results, for example, in mission critical systems. Alternatively or additionally, the instructions may be for re-training of the model using an updated training dataset of updated data elements having associated times after the times associated with the training dataset. The re-training of the model may be performed when the classification performance of the model begins to deteriorate, for example, based on new dated data that is not reflected accurately in the old data used to train the model.

Optionally, an indication of the contribution of each respective feature to shift(s) and/or to the measurement(s) exceeding the threshold is computed. The features that are most different between the two subsets may be identified. For example, the features contributing most to the shift(s) and/or to the measurement exceeding the threshold are identified. Instructions may be generated to provide the indication, for example, present on a display, store in a memory, and/or forward to another server and/or computing device.

Optionally, the generated instructions are for notifying the user on the impact associated with the performance drift including attribution of one or more features and/or the interaction between the features. When the overall model performance declines, instructions may be generated to provide a remedy such as adjustment of feature importance, sampling of observations, data imputation strategy, and/or data enrichment.

The presentation and/or alerts and/or notifications allow quick analysis of the findings associated with the structural and/or generative shifts, which may help to do governance and/or backward analysis to reproduce the shifts in one or more datasets, and/or reproducing models results by looking back in time. An interactive and/or dynamic canvas graphical user interface may be designed, for example, using drag-and-drop capabilities of different UI components such as entities and links.

Application-dependent custom tests may be created and/or applied and/or inserted. Site specific and/or application specific requirements (e.g., API calls) may be defined using back-end administrator UI. Alerts and/or generated instructions may be programmatically interfaced to an external application, for example, using a set of API calls provided by the computing device.

Figure 4:
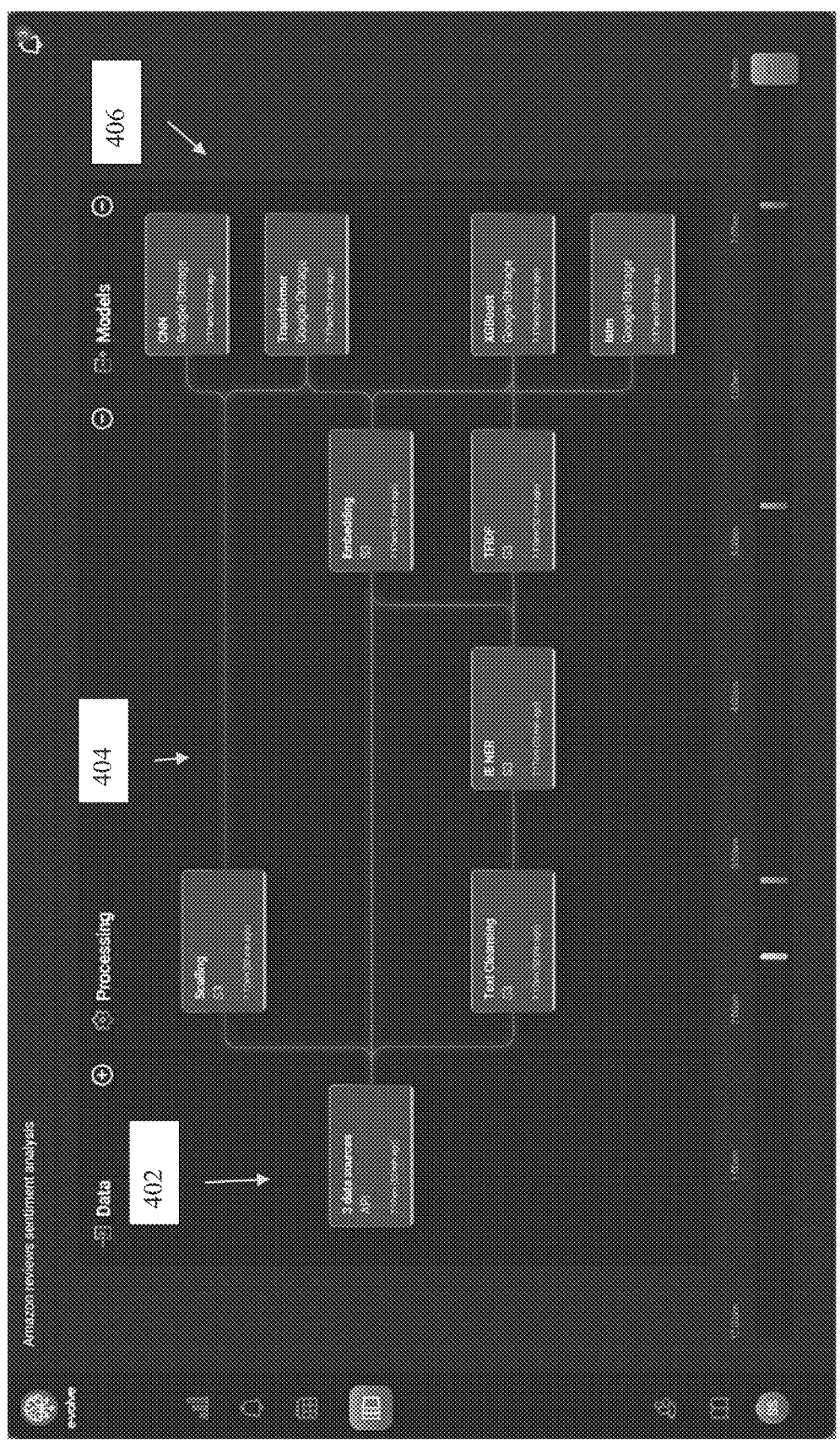
FIG. 4 is a schematic depicting a sample screen shot of a user interface with a visual indication of detected operation problems of monitored models, in accordance with some embodiments of the present invention.

Reference is now made to FIG. 4, which is a schematic depicting a sample screen shot of a user interface with a visual indication of detected operation problems of monitored models, in accordance with some embodiments of the present invention. Section 402 presents the data source(s) of data elements being fed into the model. Section 404 presents different parts of the processing described herein, for example, extraction of features, determination of shift(s), computation of measurements based on the shift(s), and/or comparison of the measurements to thresholds of the model(s). Section 406 presents the monitored models.

Referring now back to FIG. 1, at 114, one or more features described with reference to acts 104-112 are iterated. The iterations may monitor the model (e.g., in real time) to determine when the model's output (e.g., classification) performance begins to deteriorate, and trigger an appropriate action, such as a re-training of the model using more recent data.

Figure 5:
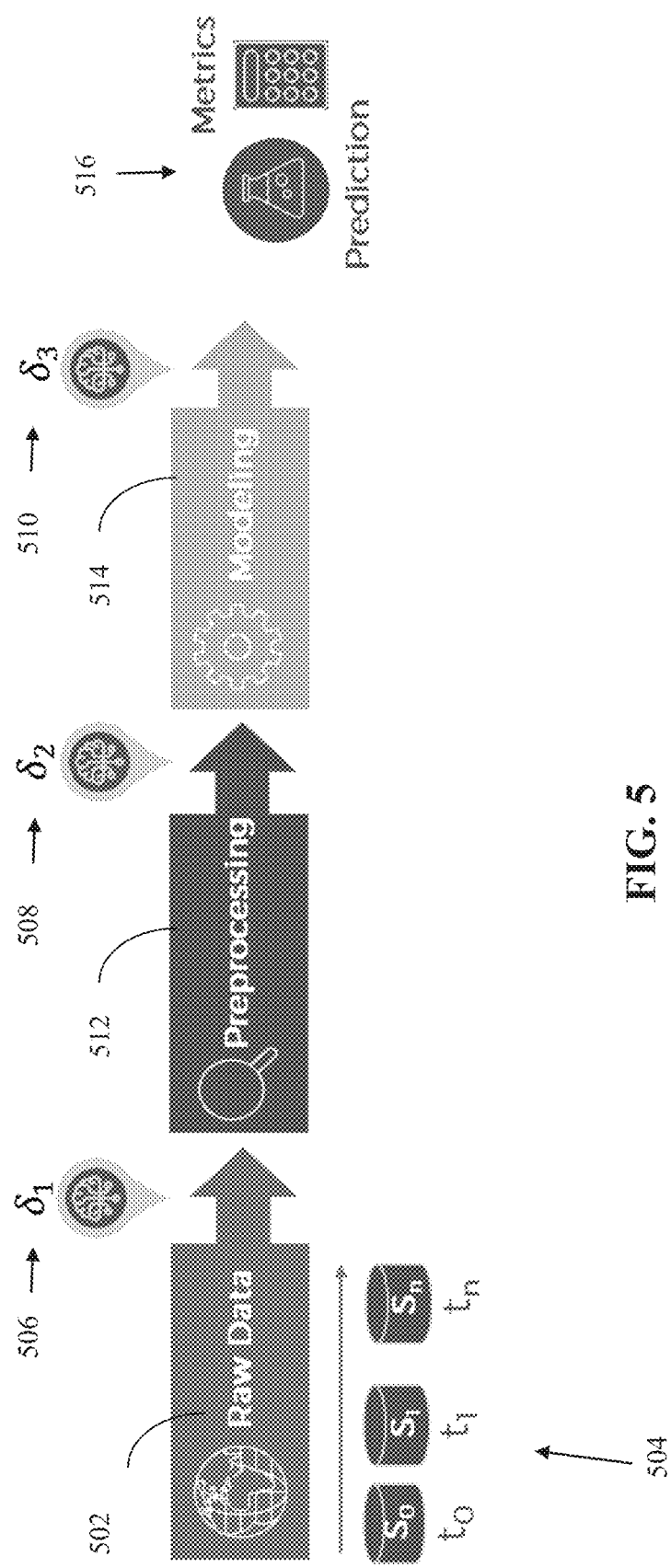
FIG. 5 is a schematic of a high-level dataflow for external monitoring of performance of a machine learning model, in accordance with some embodiments of the present invention.

Reference is now made to FIG. 5, which is a schematic of a high level dataflow for external monitoring of performance of a machine learning model, in accordance with some embodiments of the present invention. The dataflow may be based on the process described with reference to FIG. 1 and/or be implemented by components of system 200 described with reference to FIG. 2. At 502, raw data elements are provided from a data source. The raw data is organized into time sequential sets 504, denoted $S_0, S_1, \ldots S_n$, corresponding to respective time windows $t_0, t_1, \ldots t_n$, which are evaluated at $\delta_1$ 506 to detect a structural shift, and at $\delta_2$ 508 and $\delta_3$ 510 to detect generative shifts. At 512, the raw data may be preprocessed, for example, features are extracted from the raw data. At 514, measurements may be computed based on the detected shifts. At 516 the measurement is compared to a threshold to detect an indication of whether the model's metrics and/or prediction performance and/or classification performance is within a target indicative of expected operation or whether the model is operating abnormally and not according to the target.

Figure 6:
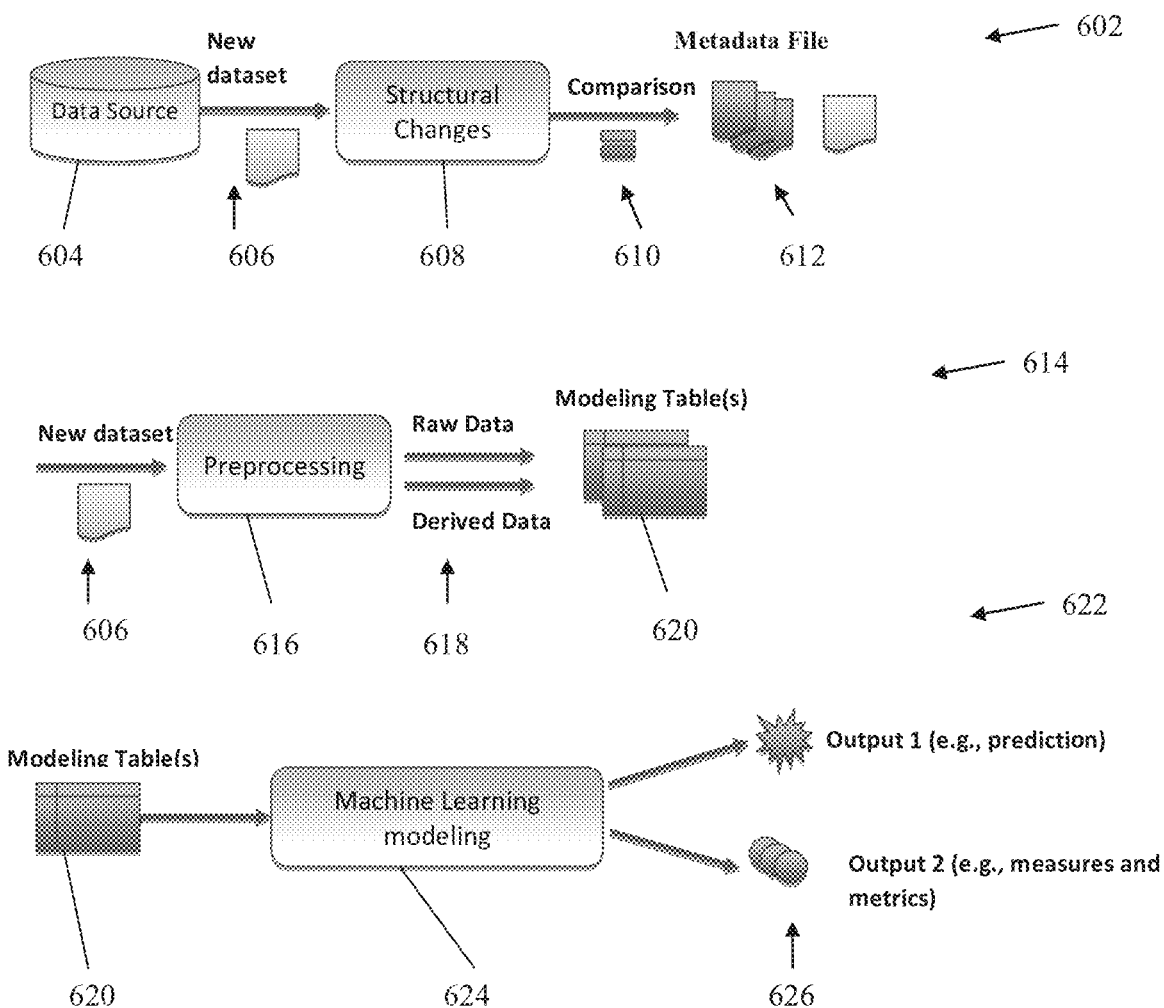
FIG. 6 is a schematic of dataflow for external monitoring of performance of a machine learning model, in accordance with some embodiments of the present invention.

Reference is now made to FIG. 6, which is a schematic of dataflow for external monitoring of performance of a machine learning model, in accordance with some embodiments of the present invention. The dataflow may be based on the process described with reference to FIG. 1 and/or be implemented by components of system 200 described with reference to FIG. 2.

Dataflow 602 depicts a datasource 604 that provides sequential data elements 606 organized into two time sequential data sets denoted by $x_t$ and $x_{t+1}$. The two datasets are evaluated for the shift of structural change 608, optionally of raw features, as described herein. Two or more metadata file descriptions are compared 610 to detect the introduction and/or removal of raw features related to $x_t$ and $x_{t+1}$. The results may be stored, for example, as a file 612.

Another dataflow 614 is for shifts denoting generative changes, as described herein. Data elements 606 are preprocessed 616 to extract raw features and derived features 618 (which are computed from combinations of the raw features as described herein) which are stored in modeling tables 620. Preprocessing phase 616 receives new dataset 606 as an input and processes 618 the data to be valid for the consequent modeling phase 622. Effectively, the output 618 of preprocessing phase 616 is a "clean" modeling table 620. The preprocessing 616 includes takas such as anomaly detection, removal of non-informative feature (e.g., zero variance), binning, normalization (e.g., log transformation), descriptive statistics (e.g., mean, median, standard deviation, distribution function, and the like).

The computing device that is located externally to the server hosting the machine learning model may be located externally to the preprocessing code and/or module.

In dataflow 622 the modeling tables 624 are fed into another process (e.g., another machine learning model executed by the client terminal externally to the monitored model) to output the measurements indicative of the expected effects on the predictions of the monitored model and/or the measures and/or metrics outputted by the monitored 626. The values of the computed measurements are evaluated relative to the threshold of the model to detect abnormal operation of the model, for example, a decay in classification accuracy and/or classification errors. Following the execution of modeling table 620 constructed in the preprocessing phase 616, and given that the computed measurements (e.g., computed by a trained model 624 trained to compute the measurements running on the computing device externally to the monitored model) is a prediction with a set of associated metrics (e.g., precision, recall, accuracy, ROC/AUC, F-measure etc.), the outputs 626 of the model 624 may be compared with each other (e.g., step t and step t+1) and/or the shifts in the model set of metrics of the monitored model and/or prediction performance by the monitored model may be determined.

Figure 7:
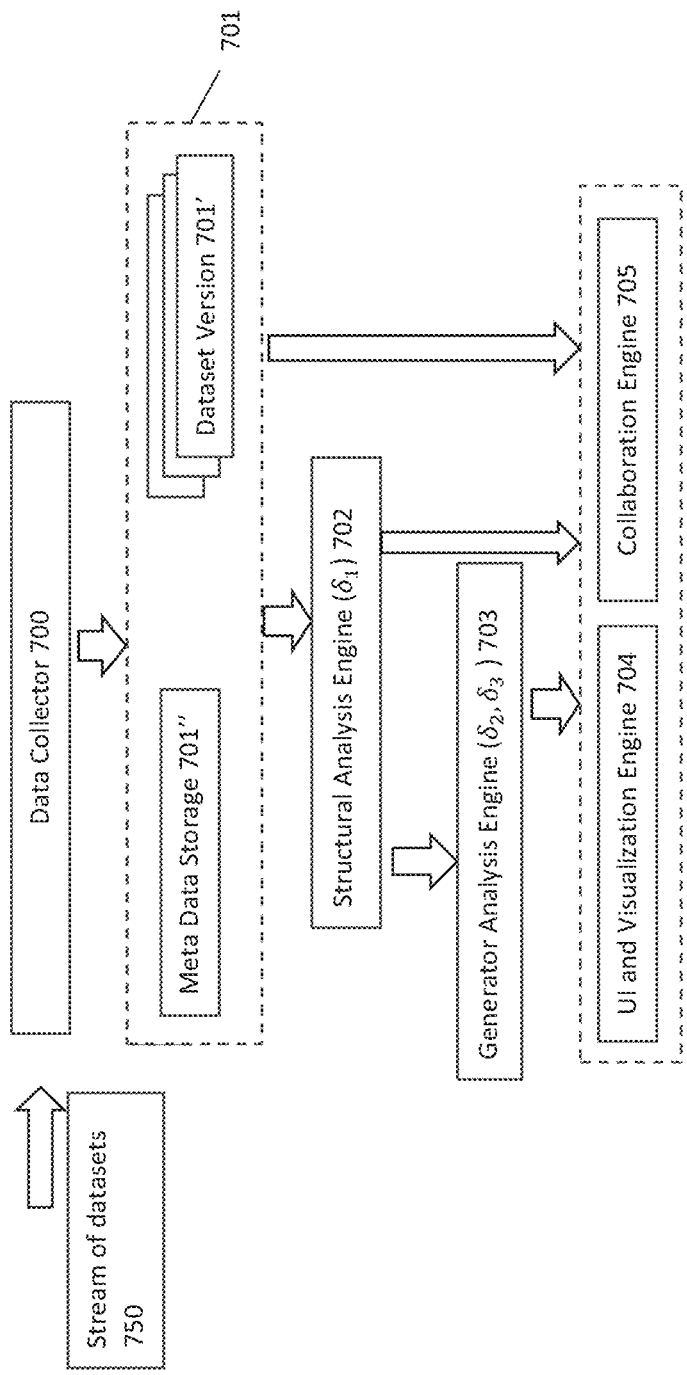
FIG. 7 is another example of an exemplary dataflow for external monitoring of performance of a machine learning model, in accordance with some embodiments of the present invention.

Reference is now made to FIG. 7, which is another example of an exemplary dataflow for external monitoring of performance of a machine learning model, in accordance with some embodiments of the present invention. The dataflow may be based on the process described with reference to FIG. 1 and/or be implemented by components of system 200 described with reference to FIG. 2.

Streams of datasets (i.e., data elements) 750 are fed into a Dynamic data collection module 700 that temporarily collects and/or organizes the data elements. The data stream may be stored in a time machine storage module 701 that manages and/or restores time-stamped versions 701' of new incoming temporal datasets enabling Time Travel capabilities. A metadata data storage 101" may store the metadata of each subset of data elements. The different versions of subsets of data elements may be archived. Log-structured storage ordered and/or atomic may be created. Consistency linear history of dataset versions may be created. A structural analysis engine 702 may analyze the dataset(s) of data elements for structural shifts as described herein, for example, checking the feature format changes, missing values detection, introduction of new features, removal of existing features and/or possible schema enforcement tests. A generator analysis engine 703 may analyze the dataset for generative shifts as described herein, for example, checking various statistical measures, covariate shift, conditional distributions shift, label and/or concept shifts, using processes based on the data formats and data types. A UI and/or visualization engine 704 may generate instructions for presenting the results on a display (e.g., within a graphical user interface), and/or generating alerts according to severity of the shift. A collaboration engine 705 may perform automatic transfer learning over time which may be based on the definition of data quality aspects and standards applicable to few customers active in the same domain using the DOC managed services.

Another example performed by Inventors implementing at least some of the systems, methods, apparatus, and/or code instructions described herein is now provided. Using a database, a covariate shift in the Dow Jones Industrial Average (DJIA) 30 stock time series is detected. Focus was placed on the AABA index. Sequential times were checked to understand when a change in the data has happened. A detection of covariate shift was demonstrated by detecting a change in the covariance-variance matrix of the data, between the times when the change has occurred. The method used is a function of the eigenvalues of the variance covariance matrix. In times when the behavior of the index remained the same, Inventors could not separate between the two data sets.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant models will be developed and the scope of the term model is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of monitoring performance of a machine learning model externally to the machine learning model, comprising:
    using at least one processor executing a code for:
        monitoring a plurality of data elements being fed into a machine learning model trained on a training dataset of historical training data elements, wherein the plurality of data elements are each associated with a respective time after a time associated with the training dataset,
        wherein the machine learning model is trained using an unsupervised approach;
        analyzing the plurality of data elements for identifying at least one shift in data characteristics between clusters created for each of at least two subsets of the plurality of data elements;
        computing according to the at least one shift, at least one measurement denoting an expected effect on output of the model;
        detecting a predicted reduction in performance of the model when the at least one measurement exceeds a threshold,
        wherein the monitoring, the analyzing, the computing, and the detecting are performed externally to the model, without accessing at least one of: data stored within the machine learning model, an implementation of the model, and data structures of the model; and in response to the detected predicted reduction in performance, re-training the model using an updated training dataset of updated data elements having associated times after the times associated with the training dataset.

2. The method of claim 1, further comprising monitoring a plurality of classification outputs of the machine learning model in response to the plurality of data elements, wherein analyzing further comprises analyzing the plurality of classification outputs for detecting shifts between at least two subsets of the plurality of classification outputs.

3. The method of claim 2, wherein the at least one shift is selected from the group consisting of: a distribution of the plurality of data elements changes between at least two subsets thereof and a conditional distribution of the outputs by the model in response to being fed the plurality of data elements remains unchanged, a distribution of the plurality of data elements remains unchanged between at least two subsets thereof and a conditional distribution of the output by the model in response to being fed the plurality of data elements changes, and the distribution of the plurality of data elements changes between at least two subsets thereof and a conditional distribution of the output by the model in response to being fed the plurality of data elements changes.

4. The method of claim 1, wherein the plurality of data elements are part of a dynamic data stream that includes variability over a time interval in values of a sequence of data elements.

5. The method of claim 1, further comprising computing a plurality of features from the plurality of data elements, and wherein analyzing comprises analyzing the plurality of features.

6. The method of claim 5, further comprising computing an indication of the contribution of each respective feature to the at least one shift and the at least one measurement exceeding the threshold.

7. The method of claim 1, wherein the at least one measurement comprises an indication in change of prediction and/or performance metrics of clustering outputs of the model.

8. The method of claim 1, wherein the at least one shift comprises a generative shift of changes in probability distribution between the at least two subsets of the plurality of data elements, wherein the at least two subsets of the plurality of data elements are obtained from the same data source and assumed to have the same distribution function.

9. The method of claim 8, wherein the generative shift is detected when a computed difference of a distinguish function applied to each of the two sets of the plurality of data elements is over a threshold.

10. The method of claim 1, wherein the at least one shift comprises data structural changes of a plurality of features extracted from the data elements.

11. The method of claim 10, wherein the data structural changes of the plurality of features are selected from the group consisting of: feature format changes, missing values, new feature, removal of existing features, and erroneous values.

12. The method of claim 10, wherein the data structural changes are detected by creating a metadata file descriptor denoting raw features extracted from each of the pluralities of data elements, and comparing the respective metadata file descriptors corresponding to two or more of the subsets of the plurality of data elements to detect data structural changes of at least one raw feature.

13. The method of claim 1, wherein the monitoring is performed by a computing device that is located externally to a server hosting the machine learning model.

14. The method of claim 1, wherein monitoring comprises intercepting the plurality of data elements before feeding into the machine learning model.

15. The method of claim 1, further comprising generating instructions to halt the model when the at least one measurement exceeds the threshold of the model.

16. The method of claim 1, wherein the threshold of the model is at least one of: learned by an external supplement model analyzing the plurality of data elements over a time interval, and/or computing during a calibration process when implementing the model.

17. The method of claim 1, wherein the at least one measurement is for cluster validation and/or assessment.

18. The method of claim 17, wherein the at least one measurement is for at least one of: clustering evaluation for assessing the goodness and/or quality of the clustering, and clustering tendency for assessing the suitability of applying clustering to a data set.

19. The method of claim 17, wherein the at least one measurement is selected from: purity, maximum matching, F-measure, entropy-based measures, pairwise measures, Jaccard coefficient, Silhouette coefficient, Hopkins statistics.

20. The method of claim 1, wherein the threshold of the model is automatically and autonomously learned.

21. The method of claim 1, further comprising computing marginal contribution of respective data elements to the at least one shift.

22. The method of claim 1, wherein the plurality of data elements comprise unstructured data, and the at least one shift is for the unstructured data.

23. The method of claim 22, wherein the unstructured data is selected from: textual data, video, audio, spatial data, and graph data.

24. The method of claim 1, further comprising providing interpretability and/or explainability for the machine learning model based on the identified at least one shift.

25. The method of claim 1, wherein the features of the method of claim 1 are performed as black-box testing without accessing internal structures of the machine learning model and/or without consideration of the architecture of the machine learning model.

26. The method of claim 1, wherein the at least one shift comprises a generative shift, selected from the group comprising of: covariance shift, conditional distribution shift, and label shift.

27. A system for monitoring performance of a machine learning model externally to the machine learning model, comprising:
   at least one hardware processor executing a code for:
      monitoring a plurality of data elements being fed into a machine learning model trained on a training dataset of historical training data elements, wherein the plurality of data elements are each associated with a respective time after a time associated with the training dataset,
      wherein the machine learning model is trained using an unsupervised approach;
      analyzing the plurality of data elements for identifying at least one shift in data characteristics between clusters created for each of at least two subsets of the plurality of data elements;
      computing according to the at least one shift, at least one measurement denoting an expected effect on output of the model;

detecting a predicted reduction in performance of the model when the at least one measurement exceeds a threshold, wherein the monitoring, the analyzing, the computing, and the detecting are performed externally to the model, without accessing at least one of: data stored within the machine learning model, an implementation of the model, and data structures of the model; and in response to the detected predicted reduction in performance, re-training the model using an updated training dataset of updated data elements having associated times after the times associated with the training dataset.

28. A non-transitory computer program product for monitoring performance of a machine learning model externally to the machine learning model, comprising:

a non-transitory memory storing thereon code for execution by at least one hardware processor, the code including instructions for:

monitoring a plurality of data elements being fed into a machine learning model trained on a training dataset of historical training data elements, wherein the plurality of data elements are each associated with a respective time after a time associated with the training dataset, wherein the machine learning model is trained using an unsupervised approach;

analyzing the plurality of data elements for identifying at least one shift in data characteristics between clusters created for each of at least two subsets of the plurality of data elements;

computing according to the at least one shift, at least one measurement denoting an expected effect on output of the model;

detecting a predicted reduction in performance of a misclassification event by the model when the at least one measurement exceeds a threshold, wherein the monitoring, the analyzing, the computing, and the detecting are performed externally to the model, without accessing at least one of: data stored within the machine learning model, an implementation of the model, and data structures of the model; and in response to the detected predicted reduction in performance, re-training the model using an updated training dataset of updated data elements having associated times after the times associated with the training dataset.

* * * * *